United States Patent [19]
Dahn et al.

[11] Patent Number: 4,965,150
[45] Date of Patent: Oct. 23, 1990

[54] PREPARATION OF VO$_2$(B) AND A NON-AQUEOUS SECONDARY CELL USING VO$_2$(B) CATHODE

[75] Inventors: Jeffrey R. Dahn, Surrey; Tony Van Buuren, New Westminster; Ulrich Vonsacken, Port Coquitlam, all of Canada

[73] Assignee: Moli Energy Limited, Canada

[21] Appl. No.: 241,853

[22] Filed: Sep. 8, 1988

[51] Int. Cl.$^5$ .................. H01M 4/48; C01B 13/14
[52] U.S. Cl. ............................ 429/194; 429/218; 423/592
[58] Field of Search ............... 429/197, 194, 218; 423/592

[56] References Cited

U.S. PATENT DOCUMENTS

| | | | |
|---|---|---|---|
| 4,228,226 | 10/1980 | Christian et al. | 429/194 |
| 4,486,400 | 12/1984 | Riley | 423/592 |
| 4,619,822 | 10/1986 | Hammou et al. | 423/592 |
| 4,740,433 | 4/1988 | Lu | 429/197 |

FOREIGN PATENT DOCUMENTS

| | | | |
|---|---|---|---|
| 0170463 | 10/1982 | Japan | 429/197 |
| 327795 | 1/1975 | U.S.S.R. | |

OTHER PUBLICATIONS

Theobald et al., *J. Solid State Chem.* 17, pp. 431–438 (1976).
Murphy et al., *J. Electrochem. Soc.* 128, pp. 2053–2060 (Oct. 1981).
Kawashima et al., *Chemistry Letters*, pp. 1131–1136 (Chem. Soc. of Japan, 1975).
Selim et al., *Thermochemica Acta* 36, pp. 287–297 (1980).
Grymonprez et al., *Acta Cryst.* A33, pp. 834–837 (1977).
Wilhelmi et al., *Acta Chemica Scandinavica* 25, pp. 2675–2687 (1971).
Abraham et al., *J. Electrochem. Soc.* 128, pp. 2493–2500 (Dec. 1981).

*Primary Examiner*—Donald L. Walton
*Attorney, Agent, or Firm*—Lerner, David, Littenberg, Krumholz & Mentlik

[57] ABSTRACT

VO$_2$(B) is prepared by heating NH$_4$VO$_3$ to a decomposition temperature between about 200° C. and about 537° C. in an atmosphere comprising excess ammonia, whereby ammonia and water vapor are liberated, leaving a residue of VO$_2$(B), the liberated water vapor is removed and the VO$_2$(B) recovered. Non-aqueous secondary cells having a cathode including the resulting VO$_2$(B) resist loss of energy capacity upon cycling.

10 Claims, No Drawings

4,965,150

PREPARATION OF VO₂(B) AND A NON-AQUEOUS SECONDARY CELL USING VO₂(B) CATHODE

BACKGROUND OF THE INVENTION

The present invention relates to the synthesis of the metastable crystal phase of vanadium oxide known as $VO_2(B)$, and to the manufacture of electrochemical cells having cathodes incorporating this material.

In recent years, there has been substantial progress in development of non-aqueous rechargeable or "secondary" electrochemical cells for use as electrical storage batteries. Considerable effort has been directed towards development of cells useful in small electronic applications such as calculators, circuit boards and watches, as replacements for nickel cadmium cells. Non-aqueous secondary cells typically include a metal anode, an electrolyte incorporating a salt of the metal, and a cathode incorporating an active material capable of reversibly taking up the metal. When the cell is discharged, metal leaves the anode, passes through the electrolyte and is taken up by the cathode with release of electrical energy. When the cell is recharged, the metal is released from the cathode to the electrolyte and redeposited back onto the anode. The cell thus stores electrical energy as chemical energy during recharge, and releases that stored energy as electrical energy during discharge.

One aspect of secondary cell research has been directed towards cells incorporating cathode-active materials defining host crystal lattice structures that undergo reversible oxidation-reduction reactions with intercalated metal ions. In particular, cells incorporating anodes of alkali metals together with cathode-active materials having crystal lattices formed from transition metal oxides demonstrate higher energy densities than many other cells. Accordingly, considerable effort has been directed towards the search for particular transition metal oxides useful as cathode-active materials in secondary cells.

The transition metal oxides which have been studied, include certain vanadium oxides. The vanadium-oxygen phase diagram is depicted in G.E. Moffat, *The Handbook of Binary Phase Diagrams*, Genium Publishing Corp., Schenectady, N.Y. (1986), the disclosure of which in said handbook is hereby incorporated by reference herein. $VO_2$ is bordered on the oxygen-rich side by compounds of the form $V_nO_{2n+1}$ (n>2) (e.g., $V_2O_5$, $V_3O_7$, $V_6O_{13}$ ... ) having tetragonal symmetry in the rutile phase, and on the oxygen poor side by compounds of the form $V_nO_{2n-1}$ (n>3) (e.g., $V_3O_5$, $V_4O_9$ ... ) having monoclinic symmetry. $VO_2$ is the point at which the transition from the oxygen rich series to the oxygen poor series. Accordingly, $VO_2$ occurs in a rutile ($VO_2(R)$), monoclinic ($VO_2(M)$) and a transitional, metastable state ($VO_2(B)$)

At all temperatures, $VO_2(B)$ has a higher free energy than $VO_2(R)$ or $VO_2(M)$. When $VO_2(B)$ is heated above about 537° C., it undergoes an irreversible, exothermic transformation to $VO_2(R)$. This high temperature is needed to overcome the activation energy between the phases. $VO_2(M)$ forms when $VO_2(R)$ is cooled below 67° C. The transition between the R and M phases are reversible. For T>67° C., the R phase is stable and for T<67° C., the M phase is stable.

Because $VO_2(B)$ transforms to $VO_2(R)$ at about 537° C., it cannot be synthesized directly from vanadium and oxygen. It must be produced by the alteration of a closely related material at a temperature low enough to prevent the transition to $VO_2(R)$ from being activated. At room temperature the $VO_2(B)$ structure, once formed, is retained indefinitely. Only upon heating to about 537° C. does it transform to the rutile phase.

Christian et al., U.S. Pat. No. 4,228,226 describes secondary cells utilizing as cathode-active materials certain vanadium oxides having the nominal stoichiometry $VO_2+y$, with y between 0.0 and 0.4. The vanadium oxides within the stoichiometric range taught by Christian et al. include $VO_2$, $V_6O_{13}$, $V_4O_9$ and $V_3O_7$ The structures of these materials are discussed in detail in *Acta Chemica Scandinavica* 25, pp. 2675–2687 (1971) and *Acta Crystallographica*, A33, pp. 834–837 (1977).

Christian et al. offers a general teaching of the synthesis of the vanadium oxides having the nominal stoichiometry $VO_{2+y}$, with y between 0.0 and 0.4, by reaction of $V_2O_5$ with appropriate quantities of vanadium metal or $V_2O_3$ at high temperatures in vacuo, by reduction of $V_2O_5$ or $NH_4VO_3$ with gaseous reducing agents such as $H_2$, $NH_3$ or $SO_2$, and by thermal decomposition of $NH_4VO_3$ in an inert atmosphere. With regard to the $VO_2(B)$, the reference offers a specific teaching of reduction of $V_2O_5$ with $H_2$ at 325° C. The $H_2$ reduction of $V_2O_5$, however, is extremely temperature sensitive and requires several days for completion. At 350 C $V_2O_3$ is formed when the reduction proceeds for three days and at 320° C., almost no reduction occurs at all after three days.

Abraham et al., *J. Electrochem Soc.* 128, 2493 (1981) discloses methods similar to those of Christian et al. to produce $VO_x$ compounds with x between 1.88 and 2.22, in which $NH_4VO_3$ is decomposed under an inert gas flow near 450° C.

The thermal decomposition products of $NH_4VO_3$ are discussed in detail in *Thermochimica Acta* 36, pp. 287–297 (1979). Soviet Pat. Application No. 327,795 describes the preparation of $V_6O_{13}$ by the reduction of $V_2O_5$ by $SO_2$. The isothermal reduction of $V_2O_5$ by $SO_2$ gas to the phases $V_4O_9$, $V_6O_{13}$ and $V_2O_4$ was also described by KaWashima et al.. *Chemistry Letters*, pp. 1131–1136 (Chem. Soc. of Japan, 1975). Hammou et al., U.S. Pat. No. 4,619,822 describes the preparation of $V_6O_{13}$ by the reduction of $V_2O_5$ in a $CO/CO_2$ atmosphere. Riley, U.S. Pat. No. 4,486,400 describes the preparation of stoichiometric $V_6O_{13}$ by the decomposition of $NH_4VO_3$ to obtain non-stoichiometric $V_6O_{13}$, which is then heated in a dynamic $CO/CO_2$ or $H/H_2O$ atmosphere having an oxygen partial pressure equal to the oxygen partial pressure over stoichiometric $V_6O_{13}$ at the heating temperature, to yield stoichiometric $V_6O_{13}$ Riley does not discuss the synthesis of $VO_2(B)$.

Theobald et al., *J. Solid State Chem.* 17, pp. 431–438 (1976), describe the preparation of $VO_2(B)$ by reaction of $V_2O_5$ with a reducing gas preferably $H_2$, although $NH_4$ is also disclosed. Theobald et al. also states that $VO_2(B)$ can be prepared by decomposing $(NH_4)_2V_6O_{16}$ and other various vanadates of ammonia, in sealed tubes, but that this method is of poor reproducibility. Murphy et al., *J. Electrochem Soc.* 128, pp. 2053–2060 (1981), describes the preparation of $VO_2(B)$ by reducing $V_2O_5$ under a hydrogen flow at 320° C. followed by drying in Ar to remove residual water.

Cells assembled with $VO_2(B)$ cathodes and lithium anodes operate at a voltage close to 2.45 volts throughout the discharge of the cell. Because this is about twice the voltage of a nickel cadmium cell, such Li/VO$_2$(B) cells could be used as direct replacements for nickel cadmium cells. Thus, a single Li/VO$_2$(B) cell can replace two nickel cadmium cells in series. Although Li/VO$_2$(B) cells have desirable voltage characteristics, the Christian et al. patent discloses that non-aqueous lithium secondary cells having cathodes comprising VO$_2$(B) suffer a 35% loss of energy capacity after only 15 charge/discharge cycles. By contrast, Christian et al. indicates that cells incorporating other cathode-active vanadium oxides do not suffer such rapid loss of energy capacity Accordingly, VO$_2$(B) has not been widely adopted as a cathode-active material in secondary cells.

SUMMARY OF THE INVENTION

One aspect of the present invention provides methods of making VO$_2$(B) useful as the cathode-active material of non-aqueous secondary cells. Methods according to this aspect of the present invention most preferably include the step of decomposing NH$_4$VO$_3$ in an atmosphere comprising excess ammonia at a temperature between 200° C. and 530° C. The excess of ammonia desirably is maintained throughout the course of the decomposition. Ammonia and water vapor are liberated as by-products of the decomposition. The process desirably also includes the step of separating the VO$_2$(B) formed in the decomposition step from the by-product ammonia and water vapor, preferably by driving off said liberated ammonia and water vapor with an inert gas flow after the decomposition. More preferably, some or all of the liberated water vapor is removed from the atmosphere surrounding the NH$_4$VO$_3$ during the decomposition step, so that the decomposition reaction and formation of VO$_2$(B) proceeds under an atmosphere substantially free of water vapor. Thus, the resulting VO$_2$(B) is substantially dry at the end of the decomposition step.

The atmosphere of excess ammonia can be maintained by retaining the ammonia generated by the decomposing NH$_4$VO$_3$ in the vicinity of the NH$_4$VO$_3$ during the decomposition, as in a suitably enclosed reaction vessel. The atmosphere of excess ammonia can also be maintained by adding to the NH$_4$VO$_3$ in a reaction vessel sufficient ammonia to provide an excess throughout the course of the decomposition.

A further aspect of the present invention provides VO$_2$(B) made by the aforementioned methods. Yet another aspect of the present invention provides a secondary electrochemical cell comprising an anode including lithium, an electrolyte and a cathode including VO$_2$(B) prepared by the aforesaid methods as the cathode-active material.

The present invention includes the discovery that secondary cells incorporating VO$_2$(B) prepared according to the aforesaid process as the cathode-active material, together with a lithium anode do not suffer from loss of energy capacity upon cycling to the same degree as do Li/VO$_2$(B) cells incorporating VO$_2$(B) prepared in other ways. Thus, cells according to preferred embodiments of the present invention suffer no appreciable loss of capacity after 20 charge/discharge cycles, compared to the 35% loss of energy capacity after 15 charge/discharge cycles demonstrated by the Li/VO$_2$(B) secondary cells described in the Christian patent. Stated another way, the preferred processes for making VO$_2$(B) according to the present invention yield a VO$_2$(B) having unexpectedly superior properties for use as a cathode-active material in a non-aqueous secondary cell. Although the present invention is not limited by any theory of operation, it is believed that these superior properties result from a greater purity and greater degree of perfection in the VO$_2$(B) crystal lattice.

DETAILED DESCRIPTION OF THE PREFERRED EMBODIMENT

Under certain conditions VO$_2$(B) is the stable product of the thermal decomposition of NH$_4$VO$_3$. In one process according to the present invention, ammonium metavanadate in solid particulate form is heated to an elevated temperature which temperature is maintained until the ammonium metavanadate has decomposed substantially completely to VO$_2$(B). A holding period of at least about one hour and preferably about two to about four hours normally is sufficient. The holding period can be increased up to 24 hours without significantly changing the product. The elevated temperature should be above 200° C. to promote decomposition of the NH$_4$VO$_3$ If the temperature during decomposition exceeds about 380° C., some of the VO$_2$ formed will be monoclinic VO$_2$ rather than VO$_2$(B). Should the temperature exceed about 537° C., all of the VO$_2$ formed will be monoclinic. At temperatures below 320° C. the reaction proceeds too slowly to be useful. Accordingly, temperatures between about 200° C. and about 537° C. are preferred. Temperatures between about 320° C. and about 380° C. are more preferred, whereas a temperature of about 320° C. is most preferred.

The atmosphere in contact with the NH$_4$VO$_3$ as it decomposes should contain excess ammonia, i.e., a substantial amount of free, uncombined ammonia so that the atmosphere is reducing rather than inert or oxidizing. The decomposition of NH$_4$VO$_3$ yields ammonia and water vapor as by-products in addition to VO$_2$. The atmosphere in contact desirably consists essentially of NH$_3$ and H$_2$O, and more preferably consists essentially of NH$_3$. An atmosphere including ammonia can be provided by conducting the reaction in an enclosed vessel and retaining by-product NH$_3$ in the vessel. The vessel may be purged with NH$_3$ from an external source before starting the reaction. The vessel may be completely enclosed so as to retain all of the ammonia evolved. Alternatively, the vessel may be vented through a vent tube immersed in a column of oil or other inert liquid or through a check valve so as to release some of the ammonia enclosed and maintain the vessel at substantially atmospheric pressure while still retaining some of the evolved ammonia in contact with the decomposing NH$_4$VO$_3$.

Where the atmosphere in contact with the NH$_4$VO$_3$ includes evolved ammonia, the water vapor evolved with the ammonia may be removed from the atmosphere by condensation. Thus, a condensing surface may be provided in contact with the atmosphere within the reaction vessel, but remote from the decomposing NH$_4$VO$_3$. The condensing surface may be maintained at a relatively low temperature, below the elevated temperature of the NH$_4$VO$_3$. Thus, the VO$_2$(B) product is separated from the evolved water vapor as the water vapor condenses on the condensing surface. The partial pressure of water vapor in the atmosphere within the reaction vessel will thus approach the vapor pressure of water at the temperature of the condensing surface.

The atmosphere in contact with the NH$_4$VO$_3$ and the decomposition products may also be provided as a stream of gases including NH$_3$ from an external source flowing over and through the $NH_4VO_3$ and the $VO_2(B)$ produced. In this case, the evolved water vapor is carried off with the flowing gas stream, thus separating the $VO_2(B)$ from the evolved water vapor as the decomposition reaction proceeds. In such a flowing stream reactor, the partial pressure of water vapor in contact with the $NH_4VO_3$ and $VO_2(B)$ produced will depend upon the moisture content of the incoming gases and upon the flow rate of gases through the system.

The partial pressure of the ammonia in the atmosphere in contact with the decomposing $NH_4VO_3$, regardless of whether it is generated by the decomposing $NH_4VO_3$ or provided from an external source, must be sufficient to reduce $NH_4VO_3$ to $VO_2(B)$. However, the ammonia partial pressure must not be so great as to reduce the $NH_4VO_3$ beyond $VO_2(B)$ to $VO_2(M)$ or $VO_x$, with x less than 2.0, thereby introducing monoclinic impurities to the reaction product.

The suitable partial pressure of ammonia is a function of the reaction time, or holding period, and temperature. At 320° C. essentially pure $VO_2(B)$ can be obtained in an atmosphere consisting essentially of ammonia at 1 atm. pressure for reaction times up to 16 hours. As temperature is increased, either the reaction time or partial pressure of ammonia must be reduced.

For temperatures in excess of 350° C. the ammonia partial pressure preferably is between about 50 and about 500 ton, more preferably between about 100 and about 250 ton, and most preferably between about 150 and about 200 ton.

When the ammonia is internally generated by the decomposing $NH_4VO_3$, the ammonia partial pressure is preferably controlled by passing an inert gas flowing over and through the $NH_4VO_3$ and $VO_2(B)$ produced to "sweep away" some of the ammonia in order to control the partial pressure. When the ammonia is obtained from an external source, the ammonia partial pressure is preferably controlled by mixing the ammonia with an inert carrier gas.

The moisture content of the $VO_2(B)$ at the end of the ammonia atmosphere contacting period depends upon the partial pressure of water vapor maintained in the ammonia-containing atmosphere during contact with the $NH_4VO_3$ and $VO_2(B)$. This partial pressure should be as low as possible so as to provide a substantially water-free atmosphere at least towards the end of the holding period so that the product $VO_2(B)$ has a relatively low moisture content at the end of the ammonia atmosphere contacting period. Preferably, the substantially water-free atmosphere is maintained throughout the contacting period so that the entire decomposition reaction proceeds under low moisture conditions. Stated another way, the $VO_2(B)$ produced in the decomposition desirably is at least partially dried during the ammonia atmosphere contacting period used for the decomposition step. Thus, the partial pressure of water vapor in the ammonia-containing atmosphere is desirably below about 100 tone, preferably below about 50 ton and most preferably below about 10 ton. The water content of the product $VO_2(B)$ is desirably below about 1,000 ppm and, preferably below about 750 ppm and most preferably below about 500 ppm. After the decomposition step, the product $VO_2(B)$ is separated from the ammonia atmosphere and cooled to room temperature. If the $VO_2(B)$ was not dried sufficiently during decomposition, it can be dried after decomposition in vacuo or in a stream of dry, non-reactive gas such as argon. The temperature of the $VO_2(B)$ should be maintained below about 530° C., and desirably at about 320° C. or less during any such subsequent drying operation.

The dry $VO_2(B)$ is then fabricated into a cathode and assembled with an anode and an electrolyte to form a cell in which said cathode is spaced from an anode comprising lithium metal with both electrodes in mutual contact with a non-aqueous electrolyte. Preferably, the electrolyte includes a lithium salt or other lithium containing compound dispersed in a suitable solvent. The electrolyte should be compatible with both cathode and anode materials. Suitable lithium salts include $LiAsF_6$, $LiPF_6$, $LiI$, $LiBr$, $LiBF_4$, $LiAlCl_4$, $LiCF_3SO_3$ and mixtures thereof. $LiPF_6$, $LiI$ and $LiAsF_6$ and mixtures thereof are preferred. A lithium salt consisting essentially of $LiAsF_6$ is most preferred. The concentration of the lithium salt in the electrolyte preferably is about 0.5 molar to about 1.5 molar, and more preferably is about 1.0 molar. The electrolyte solvent preferably comprises propylene carbonate (PC), ethylene carbonate (EC), or mixtures thereof. When the solvent comprises both PC and EC, the ratio of PC to EC by volume is preferably about 1:3 to about 3:1, more preferably about 1:2 to about 2:1, and most preferably about 1:1. The solvent may also include up to about 90% 2-methyl tetrahydrofuran (2-MTHF). The most preferred electrolyte solvent includes about 75% 2-MTHF, 12.5% PC and 12.5% EC, all by volume. References in this disclosure to percentages of solvent ingredients by volume should be understood as referring to the volume of the individual ingredients prior to mixing.

The $VO_2(B)$ cathode-active material preferably is in particulate form. The cathode may include the particulate $VO_2(B)$ with a suitable inert polymeric binder, such as the polymer of ethylene propylene diene monomer commonly referred to as EPDM, a fluoropolymer such as polytetrafluorethane (PTFE) or polyethylene oxide (PEO). Preferably, about 2% by weight or less of polymer to $VO_2(B)$ is used in the cathode.

It is desirable that the cathode maintain its electrical conductivity at all states of charge. Conductivity may be enhanced by adding an electrically conductive chemically inert material, such as graphite, to the cathode.

The cathode typically is fabricated by depositing a slurry including the $VO_2(B)$, the electrically conductive inert material and the binder in a fugitive liquid carrier on a suitable backing, and then evaporating the carrier to leave a coherent mass on the backing. Desirably, the backing utilized in the fabrication step is electrically conductive, such as a metallic sheet or foil and the cathode mass is in electrical contact with the backing. Thus, the backing may serve as a cathode current collector in the finished cell.

The mechanical structure of cells according to the present invention may be substantially conventional. Thus, the cell preferably includes a porous separator disposed between the anode and the cathode, and a conventional housing for protection of the components of the cell from the outside environment. As discussed in Canadian Patent No. 1,081,320, the cell preferably also includes a resilient device or other means for maintaining mechanical pressure on the anode. Suitable current collectors may contact the cathode and anode and permit an electrical current to be drawn by an external circuit.

The cell may be manufactured either in the charged or discharged state. If manufactured in the charged state, the $VO_2(B)$ may be prepared as described above and used directly as the cathode material. Use of lithiated $VO_2(B)$ as the cathode material allows the manufacture of the cell in the discharged state.

Lithiated $VO_2(B)$ may be prepared chemically by treatment of the $VO_2(B)$ with n-butyllithium in hexane. As disclosed by Christian et al., unit cell parameters derived from X-ray powder diffraction data suggest that the structure of lithiated $VO_2(B)$ is similar to that of the parent $VO_2(B)$.

In operation, during discharge the lithium leaves from the anode, is taken up in the $VO_2(B)$ active material of the cathode, and is subsequently released from the cathodic $VO_2(B)$ upon recharge. Thus, the stoichiometric formula of the cathode active material during operation can be written as $Li_xVO_2$, with x decreasing during recharge and increasing during discharge. Ideally, x may vary from 0 (fully charged) to 0.5 (fully discharged).

The reasons for superior performance of the $VO_2(B)$ prepared according to the process of the present invention, compared to the $VO_2(B)$ of the prior art, as active cathode materials in non-aqueous secondary cells may include several factors. Although the invention is not restricted to any theory of operation, it is believed that the process of the present invention permits the preparation of $VO_2(B)$ essentially free of other vanadium oxide phases, as well as water impurities. It is further believed that the resulting $VO_2(B)$ lattice is essentially free of undesirable distortions that would inhibit the repeated reintercalation of lithium metal ions.

EXAMPLE 1

4.438 g of $NH_4VO_3$ is placed into a silica boat and loaded into a quartz tube (1 ×5 cm in diameter). Argon is flushed through the tube at room temperature to remove the air. The argon flow is stopped and the tube is placed into a tube furnace set at 350° C. The $NH_4VO_3$ sample decomposes and liberates $H_2O$ and $NH_3$, displacing some of the argon from the tube through an oil bubbler connected to the tube exhaust. The sample is left under these conditions for two hours and then an argon flow is started to remove the $H_2O$ and $NH_3$ from the tube to dry the sample. After several hours the tube is extracted from the furnace and the sample is cooled to room temperature under an argon flow. The final sample weight is 3.1623 g. The difference in the weight of $NH_4VO_3$ starting material and the final product weight gives $x=2.026$ in $VO_x$. X-ray diffraction from the sample shows it to be pure $VO_2(B)$.

EXAMPLE 2

389.07 g of $NH_4VO_3$ in a stainless steel boat is loaded into a stainless steel furnace tube (1.7×8 cm in diameter) and flushed with argon. The tube is loaded into the furnace at 350° C. and 1 atm. $NH_3$ is passed over the sample for 10 hours at 15cc/min. The evolved $H_2O$ is trapped in a −20° C. trap connected to one end of the furnace tube. After this 10 hour ammonia contact period, argon is passed over the powder for 12 hours to dry it fully. The final powder weight is 276.85 g. This corresponds to $x=2.018$ in $VO_x$ X-ray diffraction shows this sample to be pure $VO_2(B)$.

EXAMPLE 3

Electrodes of $VO_2(B)$ prepared in Examples 1 and 2 are made using 2% and 4% EPDM by weight as a binder. Li/$VO_2(B)$ button cells and "AA" size cells are assembled using 0.005" thick lithium foil, porous separators and 1M $LiAsF_6$ dissolved in 50/50 propylene carbonate/ethylene carbonate as the electrolyte. The voltage profile of one of these "AA" cells is observed as the cell is cycled at room temperature between 2.0 and 3.0 volts at c/5 rate, i.e., at rates of change and discharge corresponding to full charge or discharge in 5 hours. The cell delivers the major portion of the charge at about 2.45 to 2.5 volts. The capacity of one of the button cells is observed during repeated c/5 cycling between 2.0 and 3.0 volts at 21° C. The cell capacity, as a percentage of first-cycle capacity, is as indicated in table I:

TABLE I

| Cycle | Capacity |
| --- | --- |
| 0 | 100% |
| 40 | 100 |
| 80 | 91.6 |
| 120 | 89.4 |
| 160 | 84.7 |

These results differ dramatically from the 35% capacity loss after only 15 cycles observed with prior art Li/$VO_2(B)$ cells. Discharge capacity of "AA" cell, was tested at various rates. 80% of nominal capacity is delivered above 2.0 volts even at C-rate discharge. The capacity versus cycle number of a button cell is observed during repeated cycling at ±c/5 between 2.0 and 2.8 volts. The cell capacity, as a percentage of first-cycle capacity, is indicated in Table II.

TABLE II

| Cycle | Capacity |
| --- | --- |
| 0 | 100% |
| 40 | 94.1 |
| 80 | 91.0 |
| 120 | 81.0 |
| 140 | 74.7 |

These results represent a significant improvement over the cycling efficiency of the $VO_2(B)$ cells of the prior art.

The foregoing description and examples should be understood by one of illustration rather than by one of limitation of the present invention as defined in the claims. As will be appreciated, numerous variations and combinations of the features set forth in the foregoing description and examples can be utilized without departing from the present invention.

What is claimed is:

1. A non-aqueous secondary cell comprising an anode comprising lithium metal, an electrolyte, and a cathode comprising $VO_2(B)$, which $VO_2(B)$ is prepared by a process including the steps of:
   maintaining $NH_4VO_3$ at a decomposition temperature between about 200° C. and about 537° C. while contacting said $NH_4VO_3$ with an atmosphere comprising excess ammonia, whereby ammonia and water vapor are liberated, leaving a residue of $VO_2(B)$,
   separating said liberated water vapor from said $VO_2(B)$, and
   recovering said $VO_2(B)$.

2. The cell of claim 1, wherein the $VO_2(B)$ is prepared by a process wherein said decomposition temperature is maintained between about 320° C. and about 380° C.

3. The cell of claim 2, wherein the $VO_2(B)$ is prepared by a process wherein said decomposition temperature is maintained at about 320° C..

4. The cell of claim 1, wherein said cathode further comprises one or more polymeric binders selected from the group of polymers consisting of EPDM, PEO and PTFE.

5. The cell of claim 4, wherein said binder is present in an amount up to 2% by weight of $VO_2(B)$.

6. The cell of claim 1, wherein said anode consists essentially of lithium metal.

7. The cell of claim 1, wherein said electrolyte comprises one or more salts selected from the group consisting of $LiAsF_6$, $LiPF_6$, $LiI$, $LiBr$, $LiBF_4$, $LiAlCl_4$ and $LiCF_3SO_3$.

8. The cell of claim 7, wherein said salt consists essentially of $LiAsF_6$.

9. $VO_2(B)$, prepared by a process including the steps of:
   maintaining $NH_4VO_3$ at a decomposition temperature between about 200° C. and about 537° C. while contacting said $NH_4VO_3$ with an atmosphere comprising excess ammonia whereby ammonia and water vapor are liberated, leaving a residue of $VO_2(B)$,
   separating said liberated water vapor from said $VO_2(B)$, and
   recovering said $VO_2(B)$.

10. The $VO_2(B)$ of claim 9, having a water content below about 1,000 ppm.

* * * * *

UNITED STATES PATENT AND TRADEMARK OFFICE
CERTIFICATE OF CORRECTION

PATENT NO. : 4,965,150

DATED : October 23, 1990

INVENTOR(S) : Dahn et al

It is certified that error appears in the above-identified patent and that said Letters Patent is hereby corrected as shown below:

Column 2, line 10, "VO$_2$+y" should read --VO$_{2+y}$--.

Column 2, line 12, "V307" should read --V$_3$O$_7$--.

Column 2, line 27, "350 C" should read --350°C--.

Column 2, line 43, "KaWashima et al." should read
--Kawashima et al.--

Column 2, line 54, insert --.-- between "V$_6$O$_{13}$" and "Riley".

Column 2, line 60, "(NH4)2" should read --(NH$_4$)$_2$--.

Column 3, line 12, insert --.-- between "capacity" and "Accordingly".

Column 4, line 21, insert --.-- between "NH$_4$VO$_3$" and "If".

Column 5, line 58, "tone" should read --ton--.

Column 7, line 53, "1.7X8" shc

Signed and Sealed this

Twenty-eighth Day of April, 1992

Attest:

HARRY F. MANBECK, JR.

*Attesting Officer*  *Commissioner of Patents and Trademarks*